United States Patent Office 3,654,262
Patented Apr. 4, 1972

---

3,654,262
3-DEOXY-3-C-LOWER ALKYL GLYCOSIDES AND NUCLEOSIDES
Edward Walton, Scotch Plains, N.J., assignor to Merck & Co., Inc., Rahway, N.J.
No Drawing. Filed Aug. 21, 1969, Ser. No. 852,097
Int. Cl. C07d 47/18, 51/52, 51/54
U.S. Cl. 260—210 R          9 Claims

ABSTRACT OF THE DISCLOSURE

Novel 3 - deoxy - 3 - C-lower-alkyl-β-D-xylofuranosyl halide intermediates are prepared by the steps of (A) forming the 5-O-trityl derivative of an alkyl 2,3-anhydro-β-D-ribofuranoside, (B) reacting with a lower alkyl Grignard reagent to obtain the alkyl 3-deoxy-3-C-lower-alkyl - 5 - O-trityl-β-D-xylofuranoside, (C) removal of 5 - O - trityl group, (D) acylating to the alkyl 2,5-di-O - acyl - 3 - deoxy-3-C-lower-alkyl-β-D-xylofuranoside, and (E) converting the latter compound to the 2,5-di-O-acyl-3-deoxy-3-lower-alkyl-D-xylofuranosyl halide by a halogen replacement reaction. Steps C and D may be reversed. The novel intermediate is then converted into novel purine and pyrimidine nucleosides. The novel compounds of this invention have utility in vitro in inhibiting cell growth. They are also useful as screening agents for ultraviolet light.

---

This invention relates to novel deoxy branched chain sugar nucleosides. More particularly, this invention relates to novel 3-deoxy-3-C-lower-alkyl-D-xylofurancesyl halide intermediates, and to purine and pyrimidine nucleosides prepared therefrom, as well as to processes for the preparation of the novel intermediates.

The novel 3 - deoxy - 3 - C-lower-alkyl-nucleosides are the α- and/or β-anomers represented by Formulas A and B, and the novel intermediates are represented by Formula C.

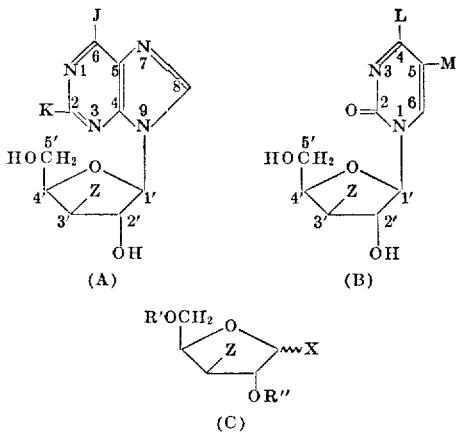

wherein

J and K may be the same or different, hydrogen, lower alkyl, halogen, mercapto, lower alkylmercapto, amino, or lower alkyl substituted amino, provided that when J is amino and K is hydroxy, the ribofuranoyl moiety may also be joined to the purine at the 7-position;

L and M may be the same or different, alkoxy, hydroxy, amino, or alkyl substituted amino, and, in addition, M may also be hydrogen, alkyl, halogen or halogenated alkyl, especially trifluoromethyl;

R' and R'' are each hydrogen, or an acyl residue of an organic carboxylic acid selected from the group consisting of lower alkanoyl, benzoyl, or substituted benzoyl;

X is chloro, bromo, or lower alkoxy; and

Z is lower alkyl.

Typical of the alkanoyl groups are acetyl, propionyl and butyryl. The benzoyl group may be unsubstituted, or substituted by lower alkyl (toluyl or xyloyl); lower alkoxy such as methoxybenzoyl or ethoxybenzoyl; halobenzoyl such as chlorobenzoyl or bromobenzoyl; and nitrobenzoyl.

The compounds of the present invention have demonstrated a variety of valuable utilities. They are capable of inhibiting ribonucleic acid (RNA) synthesis, for example, acid insoluble RNA synthesis, in Ehrlich ascites cells and KB cells. In in vitro tests, the growth of KB cells is markedly suppressed as is the incorporation of hypoxanthine into acid insoluble RNA. The compounds are therefore useful as antimetabolites as cell growth inhibitors and for the in vitro study of metabolism systems. They also demonstrate favorable cytotoxicity characteristics considered with their cell growth depression. In addition, they show a marked resistance to the action of adenosine deaminase.

The nucleosides may also be converted to nucleotides by treatment with phosphoric acid derivatives in accordance with known techniques. As such, they are useful in a formulation of media for selective culturing of animal tissue cells. These nucleotides may also be useful in the study of in vitro nucleic acid metabolism.

The compounds of the present invention are also suitable for use as screening agents for ultraviolet light. In particular, they are useful as stabilizing agents for plastics against deterioration by ultraviolet light. It is well known that most if not all plastics undergo deterioration when exposed to sunlight and air. Recent advances in plastic technology have made available a large variety of plastics. It has thus become increasingly important to provide materials which will stabilize plastics from deterioration due to ultraviolet light.

The stabilizer is incorporated in the plastic or other substrate in a stabilizing concentration ranging from about 0.05% to about 12% by weight. The preferred concentration is about 0.5% to about 2% by weight of the substrate. The stabilizer may be incorporated in the plastic in any suitable manner and at any suitable stage of preparation. Since the stabilizer itself may inhibit polymerization of the monomer, generally it is preferred to incorporate the stabilizer after the plastic has been formed. For example, the plastic may be recovered in the form of a powder, pellets, cylinders, spheres, sheets, etc., and these may then be mixed with the stabilizer in any suitable manner, such as partly melting the plastic and adding the stabilizer to the hot melt. The plastic can be heated on a steam-heated two-roll mill of conventional commercial design, for example, and the stabilizer may be added during this operation. The plastic containing the stabilizer is recovered in sheet form and may be fabricated in any desired fashion. The stabilizer may be added, however, in any other suitable manner.

The stabilizer may be used as such or it may be utilized as a solution in a suitable solvent, such as alcohol, benzene, and xylene. The solvent employed should not be harmful to the plastic and, therefore, the preferred solvent is the same solvent as that used during the preparation of the plastic.

The stabilizer may be used with other additives incorporated in plastics for various purposes and they may also be used along with other ultraviolet light stabilizers.

The novel intermediates (C) are useful in preparing the branched-chain sugar nucleosides (A) and (B) which have the above-described biological properties.

The novel intermediates containing a branched-chain sugar are the α- and β-anomers of the compounds represented by Formula C:

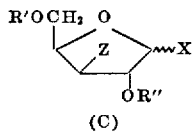

(C)

wherein

R' and R" are each hydrogen, or an acyl residue of an organic carboxylic acid selected from the group consisting of lower alkanoyl, benzoyl, or substituted benzoyl; X is chloro, bromo, or lower alkoxy; and Z is lower alkyl.

FLOW SHEET I

Preparation of 3-deoxy-3-C-lower-alkyl-D-xylofuranosyl halide intermediate

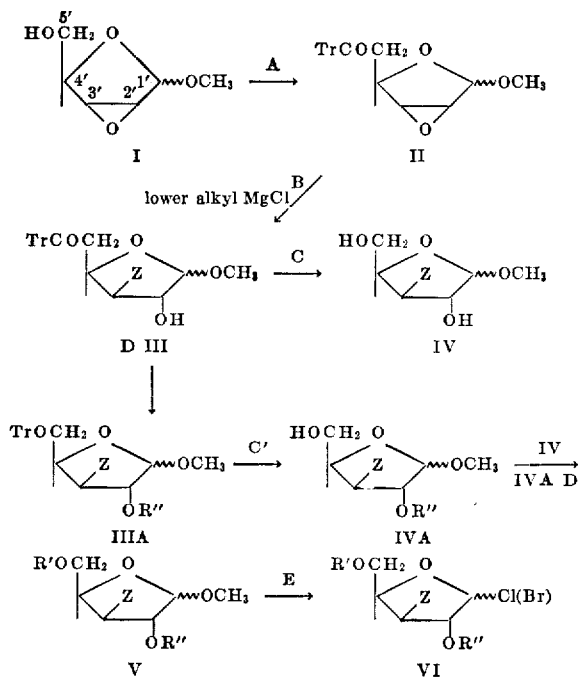

Tr = triphenylmethyl

Typical compounds are:
3-deoxy-3-C-methyl-D-xylofuranosyl chloride,
3-deoxy-3-C-ethyl-D-xylofuranosyl chloride,
3-deoxy-3-C-propyl-D-xylofuranosyl chloride,
3-deoxy-3-C-methyl-D-xylofuranosyl bromide,
2,5-di-O-acetyl-3-deoxy-3-C-methyl-D-xylofuranosyl chloride,
2,5-di-O-benzoyl-3-deoxy-3-C-methyl-D-xylofuranosyl chloride,
3-deoxy-3-C-methyl-2,5-di-O-p-nitrobenzoyl-D-xylofuranosyl chloride, and
3-deoxy-3-C-methyl-2,5-di-O-toluyl-D-xylofuranosyl chloride.

Flow Sheet I illustrates the preparation of the 3-deoxy-2,5-di-O-acyl-3-C-methyl-D-xylofuranosyl halide starting from the known alkyl 2,3-anhydro-D-ribofuranoside.

As can be seen, the starting material is an alkyl glycoside in the epoxy form and in the D-configuration. Representative of such starting materials are methyl 2,3-anhydro-D-ribofuranoside, ethyl 2,3-anhydro-D-ribofuranoside, and the like. The alkyl glycosides are produced according to known procedures.

In Step A of this procedure, the alkyl 2,3-anhydro-D-ribofuranoside (I) is suitably protected at the 5-O-position, preferably with a trityl group. Illustrative of other protecting groups which might be used are 5-O-benzyl, 5-O-diphenylmethyl or triphenylmethyl where the one or more of the phenyl groups is substituted with one or more alkoxy groups. These compounds are prepared by methods known in the art.

The 5-O-trityl derivative (II) can be prepared, for example, by heating the anhydro derivative (I) with trityl chloride and an organic base, such as pyridine, on a steam bath for several hours. On the Flow Sheet the protecting group is designated as "Tr" (trityl or triphenylmethyl) for purposes of simplification.

In Step B the alkyl 2,3-anhydro-5-O-trityl-D-ribofuranoside (II) is reacted with a Grignard reagent in essentially stoichiometric proportions at a temperature range of from 5° C. to about 80° C., thereby forming the alkyl 3-deoxy-3-C-lower-alkyl-5-O-trityl-D-xylofuranoside (III). Alkyl 3-deoxy-3-chloro-5-O-trityl-D-xylofuranoside is also obtainable in minor amount as a by-product. The Grignard reagents used in this reaction are lower alkyl magnesium halides. Examples of Grignard reagents are methyl magnesium bromide, ethyl magnesium bromide, methyl magnesium iodide, propyl magnesium chloride, and the like.

In Step C, the 5-O-protecting group of the alkyl 3-deoxy-3-C-lower-alkyl-5-O-trityl-D-xylofuranoside (III) is removed by methods known in the art to afford the 5-OH group. The trityl group is conveniently removed, for example, by refluxing the trityl derivative (III) in aqueous alcoholic acetic acid solution for several hours.

The resulting alkyl 3-deoxy-3-C-lower-alkyl-D-xylofuranoside (IV) is acylated under basic conditions with acylating agents such as acyl halide or an acid anhydride. Examples of these acylating agents are benzoyl chloride, benzoyl bromide, p-nitrobenzoyl chloride, acetic anhydride and propionic anhydride. This acylation step is carried out at a temperature range of from about 20° C. to about 100° C. for a time period of 2 to 72 hours in the presence of an organic base such as pyridine. An alkyl 2,5-di-O-acyl-3-deoxy-3-C-lower-alkyl - D - xylofuranoside (V) results.

In the alternative, the alkyl 3-deoxy-3-C-lower-alkyl-5-O-trityl-D-xylofuranose (III) is first acylated at the 2-position to obtain the 2-O-acyl--deoxy-3-C-lower-alkyl-D-xylofuranoside (IIIA). The trityl group is then removed to give alkyl 2-O-acyl-3-deoxy-3-C-alkyl-D-xylofuranoside (IVA), and the latter compound is acylated again to give the alkyl 2,5-di-O-acyl-3-deoxy-3-C-lower-alkyl-D-xylofuranoside (V).

In Step E the alkyl 2,5-di-O-acyl-3-deoxy-lower-alkyl-D-xylofuranoside is converted to the halo sugar by a halogen replacement reaction utilizing the desired hydrogen halide in an appropriate solvent such as acetic acid, methylene chloride, tetrachloroethane or propionic acid. This replacement reaction takes place at a temperature of from 5° C. to 30° C. Such agents as hydrogen bromide, hydrogen chloride, thionyl chloride, metal halides, and the like, are suitable. Hydrogen chloride and hydrogen bromide are preferred. The same halo sugar (VI) is usually obtained from either the α- or β-anomer of (V), or a mixture of the two anomers.

The novel 3-deoxy-3-lower-alkyl purine nucleosides containing a 3-deoxy-3-lower-alkyl group in the sugar moiety are the α- and β-isomers of the nucleosides represented by Formula A:

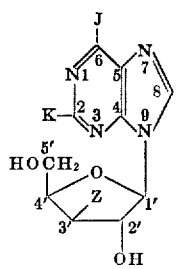

wherein

J and K may be the same or different, hydrogen, lower alkyl, halogen, mercapto, lower-alkyl mercapto, amino, or lower-alkyl-substituted amino, provided that when J is amino and K is hydroxy, the ribofuranosyl moiety may also be joined to the purine at the 7-position; and Z is lower alkyl.

The compounds are termed generally 2-K-6-J-9-(3-deoxy-3-lower-alkyl-D-xylofuranosyl)purines, although also included within the scope of the invention is the 7-isomer of compounds having the structure (A) when J is hydroxy and K is amino.

Representative of the novel purine nucleoside compounds of the present invention, but not limited to these compounds, are:

9-(3-deoxy-3-C-methyl-D-xylofuranosyl)purine,
9-(3-deoxy-3-C-methyl-D-xylofuranosyl)-2-methylpurine,
9-(3-deoxy-3-C-methyl-D-xylofuranosyl)-6-methylpurine,
9-(3-deoxy-3-C-methyl-D-xylofuranosyl)-6-aminopurine,
9-(3-deoxy-3-C-methyl-D-xylofuranosyl)-2,6-diaminopurine,
9-(3-deoxy-3-C-methyl-D-xylofuranosyl)-6-methylaminopurine,
9-(3-deoxy-3-C-methyl-D-xylofuranosyl)-2,6-dimethylaminopurine,
9-(3-deoxy-3-C-methyl-D-xylofuranosyl)-6-ethylaminopurine,
9-(3-deoxy-3-C-methyl-D-xylofuranosyl)-2-amino-6-hydroxypurine,
9-(3-deoxy-3-C-methyl-D-xylofuranosyl)-6-mercaptopurine,
9-(3-deoxy-3-C-methyl-D-xylofuranosyl)-2-methyl-6-mercaptopurine,
9-(3-deoxy-3-C-methyl-D-xylofuranosyl)-6-chloropurine,
9-(3-deoxy-3-C-methyl-D-xylofuranosyl)-6-amino-2-fluoropurine,
9-(3-deoxy-3-C-ethyl-D-xylofuranosyl)-6-methylpurine,
9-(3-deoxy-3-C-ethyl-D-xylofuranosyl)-6-aminopurine,
9-(3-deoxy-3-C-ethyl-D-xylofuranosyl)-2,6-diaminopurine,
9-(3-deoxy-3-C-ethyl-D-xylofuranosyl)-6-methylaminopurine,
9-(3-deoxy-3-C-ethyl-D-xylofuranosyl)-2,6-dimethylaminopurine,
9-(3-deoxy-3-C-ethyl-D-xylofuranosyl)-6-ethylaminopurine,
9-(3-deoxy-3-C-ethyl-D-xylofuranosyl)-2-amino-6-hydroxypurine,
9-(3-deoxy-3-C-ethyl-D-xylofuranosyl)-6-mercaptopurine,
9-(3-deoxy-3-C-ethyl-D-xylofuranosyl)-2-methyl-6-mercaptopurine,
9-(3-deoxy-3-C-ethyl-D-xylofuranosyl)-6-chloropurine,
9-(3-deoxy-3-C-ethyl-D-xylofuranosyl)-6-amino-2-fluoropurine, and the like.

The above-defined 2-, 6- or 2,6-substituted purine nucleosides containing a 3-deoxy-3-lower-alkyl group in the sugar moiety, are prepared as shown on Flow Sheet II by reacting a 2,5-di-O-acyl-D-xylofuranosyl halide (VI).

FLOW SHEET II

Preparation of 9-(3-deoxy-3-C-lower-alkyl-D-ribofuranosyl)purines

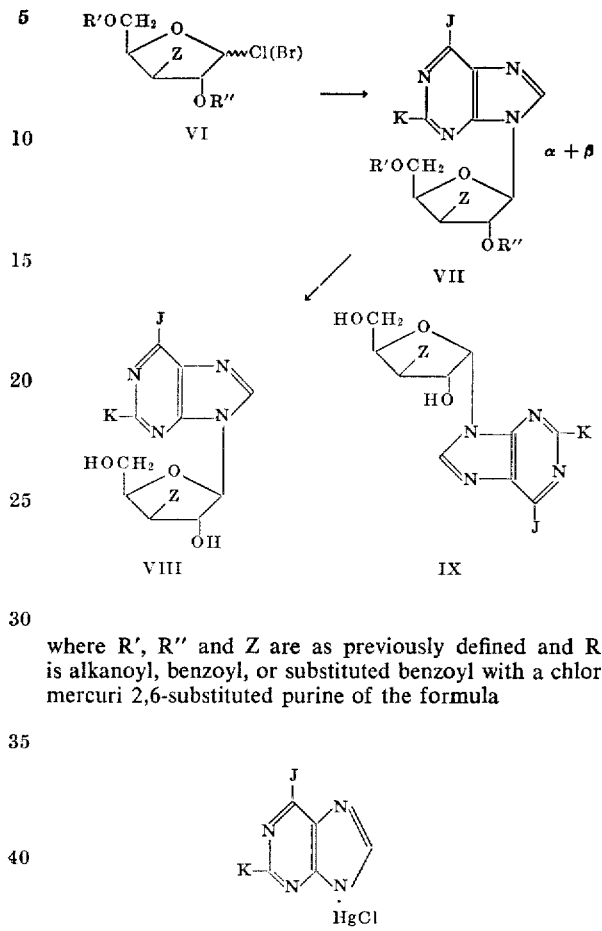

where R', R" and Z are as previously defined and R'" is alkanoyl, benzoyl, or substituted benzoyl with a chloromercuri 2,6-substituted purine of the formula

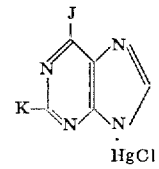

where

J and K may be the same or different, hydrogen, loweralkyl, halogen, lower acylamino or acyl-lower alkyl substituted-amino groups.

The reaction proceeds essentially stoichiometrically at a temperature range of about 25° C. to about 150° C., and preferably between about 100° C. and 140° C. In this step, the reaction is carried out in an appropriate solvent. The selection of the solvent is not important so long as it is an inert solvent and boils in a range of about 25° C. to 150° C. Examples of such solvents are benzene, dibutyl ether, cyclohexane, toluene, xylene, and the like. The preferred solvents are toluene and xylene. The reaction is normally complete in about 15 minutes to about 5 hours, depending on the reaction temperature. After obtaining the intermediate reaction product, the compounds are then further treated as described below, as necessary to obtain the desired 2,6-substituents in the purine portion of the nucleoside.

In the case of solvolysis, for example, to convert a 6-benzamido group to a 6-amino group, the reaction is carried out in the presence of a basic catalyst in an appropriate solvent at a temperature range of from about 5° C. to about 150° C., and preferably about 65° C. to about 90° C. in a reaction time of from about 15 minutes to about 5 hours. The length of reaction time is dependent upon the temperature, the catalyst and solvent used. Examples of basic catalysts are alkali and alkaline earth bases and their corresponding alkoxides, solutions of ammonia, amines and substituted amines.

Examples of the solvents are lower alcohols. The preferred solvent is methanol. In this treatment, the acyl blocking groups will also be removed.

In the case of aminolysis, for example, to convert a 6-halo-substituent to a 6-amino-substituent, the reaction is carried out in the presence of ammonia, a monoalkyl or a dialkylamine at a temperature range of from about 25° C. to about 150° C., and preferably about 85° C. to about 110° C. for a reaction time of from about 15 minutes to about 5 hours. Examples of amines are methylamine, dimethylamine, ethylamine, diethylamine, propylamine and dipropylamine. Reaction with ammonia, or with a lower boiling amine such as methylamine, are carried out in a sealed reaction vessel to prevent loss of the volatile reagent at the temperatures indicated. In this treatment, the acyl blocking groups will also be removed.

In the case of mercaptolysis, for example, of a 6-halo-substituent, the reaction is carried out in the presence of thiourea or a metal salt of a lower alkyl mercaptan at a temperature range of from about 25° C. to about 150° C., and preferably about 65° C. to about 90° C., and a reaction time of from about 15 minutes to about 5 hours. Examples of the alkali or alkaline earth metal salts of alkyl mercaptans are sodium methylmercaptan, sodium ethylmercaptan, sodium isopropylmercaptan, potassium methylmercaptan and calcium methylmercaptan.

When the mercaptolysis reactant is thiourea, the acyl blocking groups are not removed at R' and R'' portions, and the resulting intermediate must be subjected to basic solvolysis in order to obtain the mercapto compounds of the invention.

The compound where both K and L are hydrogen, is obtained from the 9-(2,5-di-O-acyl-3-deoxy-3-lower-alkyl-β-D-ribofuranosyl)-6-halopurine by hydrogenation in the presence of a palladium catalyst at a temperature of from room temperature up to about 80° C. The temperature is not critical, although a slightly elevated temperature is preferred. The hydrogenation is carried out in the presence of an inert solvent such as methanol, ethanol, dioxane, and the like. Such treatment removes a chloro or bromo atom at the 6-position. The R' and R'' acyl groups present at the 2,5-O-positions are then removed, for example, by treatment with an alkali metal alkoxide solution as previously described.

The 3'-deoxy-3'-C-lower-alkyl ribofuranosyl nucleosides having the 2-fluoro-6-amino-substituents in the purine nucleus are prepared by a diazotization reaction from the 9-(3-deoxy-3-C - lower-alkyl - D-xylofuranosyl)-2,6-diaminopurine.

The novel 2(1H)-pyrimidinone nucleosides containing a branched-chain in the sugar moiety are represented by the following structural Formulas B:

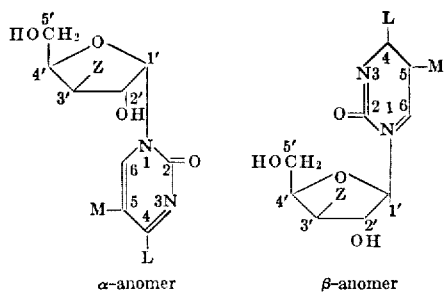

α-anomer    β-anomer wherein

L and M may be the same or different, lower alkoxy, hydroxy, amino, or lower-alkyl substituted amino, and, in addition, M may also be hydrogen, lower alkyl, halogen or halogenated lower alkyl, especially trifluoromethyl; and Z is lower alkyl.

Typical of the L and M groups, which may be the same or different in the compounds of the present invention, are lower alkoxy radicals such as methoxy, ethoxy or propoxy; hydroxy; amino and lower-alkyl substituted amino such as methylamino, dimethylamino, ethylamino, diethylamino, propylamino or dipropylamino. In addition, M may also be hydrogen; a lower alkyl radical such as methyl, ethyl or propyl; a halogen such as chlorine, bromine, iodine or fluorine, and a halogenated alkyl, especially trifluoromethyl.

Representative of the novel compounds obtained by the method of the present invention, but not limited to these compounds, are the α- and β-forms of 1-(3-deoxy-3-C-methyl-D-xylofuranosyl)-4-methoxy-2(1H)-pyrimidinone;
1-(3-deoxy-3-C-methyl-D-xylofuranosyl)-4-ethoxy-2-(1H)-pyrimidinone;
1-(3-deoxy-3-C-methyl-D-xylofuranosyl)-4-propoxy-2-(1H)-pyrimidinone;
1-(3-deoxy-3-C-methyl-D-xylofuranosyl)-4-hydroxy-5-chloro-2(1H)-pyrimidinone;
1-(3-deoxy-3-C-methyl-D-xylofuranosyl)-4-amino-5-trifluoromethyl-2(1H)-pyrimidinone;
1-(3-deoxy-3-C-methyl-D-xylofuranosyl)-4-hydroxy-5-trifluoromethyl-2(1H)-pyrimidinone;
1-(3-deoxy-3-C-methyl-D-xylofuranosyl)-4-hydroxy-5-bromo-2(1H)-pyrimidinone;
1-(3-deoxy-3-C-methyl-D-xylofuranosyl)-4-hydroxy-5-iodo-2(1H)-pyrimidinone;
1-(3-deoxy-3-C-methyl-D-xylofuranosyl)-4-hydroxy-5-fluoro-2(1H)-pyrimidinone;
1-(3-deoxy-3-C-methyl-D-xylofuranosyl)-4-amino-2(1H)-pyrimidinone;
1-(3-deoxy-3-C-methyl-D-xylofuranosyl)-4-methylamino-2(1H)-pyrimidinone;
1-(3-deoxy-3-C-methyl-D-xylofuranosyl)-4-dimethylamino-2(1H)-pyrimidinone;
1-(3-deoxy-3-C-methyl-D-xylofuranosyl)-4-diethylamino-2(1H)-pyrimidinone;
1-(3-deoxy-3-C-methyl-D-xylofuranosyl)-4,5-dimethoxy-2(1H)-pyrimidinone;
1-(3-deoxy-3-C-methyl-D-xylofuranosyl)-4-methoxy-5-fluoro-2(1H)-pyrimidinone;
1-(3-deoxy-3-C-methyl-D-xylofuranosyl)-4-hydroxy-5-methyl-2(1H)-pyrimidinone;
1-(3-deoxy-3-C-methyl-D-xylofuranosyl)-4-hydroxy-5-ethyl-2(1H)-pyrimidinone;
1-(3-deoxy-3-C-methyl-D-xylofuranosyl)-4-amino-5-methyl-2(1H)-pyrimidinone;
1-(3-deoxy-3-C-methyl-D-xylofuranosyl)-4-amino-5-ethyl-2(1H)-pyrimidinone;
1-(3-deoxy-3-C-methyl-D-xylofuranosyl)-4-methoxy-5-methyl-2(1H)-pyrimidinone;
1-(3-deoxy-3-C-methyl-D-xylofuranosyl)-4-ethoxy-5-methyl-2(1H)-pyrimidinone;
1-(3-deoxy-3-C-methyl-D-xylofuranosyl)-4-methoxy-5-ethyl-2(1H)-pyrimidinone;
1-(3-deoxy-3-C-methyl-D-xylofuranosyl)-4-ethoxy-5-ethyl-2(1H)-pyrimidinone;
1-(3-deoxy-3-C-methyl-D-xylofuranosyl)-4-amino-5-bromo-2(1H)-pyrimidinone;
1-(3-deoxy-3-C-methyl-D-xylofuranosyl)-4-amino-5-fluoro-2(1H)-pyrimidinone;
1-(3-deoxy-3-C-methyl-D-xylofuranosyl)-4-hydroxy-5-amino-2(1H)-pyrimidinone;
1-(3-deoxy-3-C-methyl-D-xylofuranosyl)-4-hydroxy-5-methylamino-2(1H)-pyrimidinone;
1 (3-deoxy-3-C-methyl-D-xylofuranosyl)-4-hydroxy-5-dimethylamino-2(1H)-pyrimidinone;

1-(3-deoxy-3-C-methyl-D-xylofuranosyl)-
4-methoxy-2(1H)-pyrimidinone;
1-(3-deoxy-3-C-ethyl-D-xylofuranosyl)-
4-ethoxy-2(1H)-pyrimidinone;
1-(3-deoxy-3-C-ethyl-D-xylofuranosyl)-
4-propoxy-2(1H)-pyrimidinone;
1-(3-deoxy-3-C-ethyl-D-xylofuranosyl)
4-hydroxy-5-chloro-2(1H)-pyrimidinone;
1-(3-deoxy-3-C-ethyl-D-xylofuranosyl)-
4-amino-5-trifluoromethyl-2(1H)-pyrimidinone;
1-(3-deoxy-3-C-ethyl-D-xylofuranosyl)-
4-hydroxy-5-trifluoromethyl-2(1H)-pyrimidinone;
1-(3-deoxy-3-C-ethyl-D-xylofuranosyl)-
4-hydroxy-5-bromo-2(1H)-pyrimidinone;
1-(3-deoxy-3-C-ethyl-D-xylofuranosyl)-
4-hydroxy-5-iodo-2(1H)-pyrimidinone;
1-(3-deoxy-3-C-ethyl-D-xylofuranosyl)-
4-hydroxy-5-fluoro-2(1H)-pyrimidinone;
1-(3-deoxy-3-C-ethyl-D-ribofuranosyl)-
4-amino-2(1H)-pyrimidinone;
1-(3-deoxy-3-C-ethyl-D-xylofuranosyl)-
4-methylamino-2(1H)-pyrimidinone;
1-(3-deoxy-3-C-ethyl-D-xylofuranosyl)-
4-dimethylamino-2(1H)-pyrimidinone;
1-(3-deoxy-3-C-ethyl-D-xylofuranosyl)-
4-diethylamino-2(1H)-pyrimidinone;
1-(3-deoxy-3-C-ethyl-D-xylofuranosyl)-
4,5-dimethoxy-2(1H)-pyrimidinone;
1-(3-deoxy-3-C-ethyl-D-xylofuranosyl)-
4-methoxy-5-chloro-2(1H)-pyrimidinone;
1-(3-deoxy-3-C-ethyl-D-xylofuranosyl)-
4-methoxy-5-fluoro-2(1H)-pyrimidinone;
1-(3-deoxy-3-C-ethyl-D-xylofuranosyl)-
4-hydroxy-5-methyl-2(1H)-pyrimidinone;
1-(3-deoxy-3-C-ethyl-D-xylofuranosyl)-
4-hydroxy-5-ethyl-2(1H)-pyrimidinone;
1-(3-deoxy-3-C-ethyl-D-xylofuranosyl)-
4-amino-5-methyl-2(1H)-pyrimidinone;
1-(3-deoxy-3-C-ethyl-D-xylofuranosyl)-
4-amino-5-ethyl-2(1H)-pyrimidinone;
1-(3-deoxy-3-C-ethyl-D-xylofuranosyl)-
4-methoxy-5-methyl-2(1H)-pyrimidinone;
1-(3-deoxy-3-C-ethyl-D-xylofuranosyl)-
4-ethoxy-5-methyl-2(1H)-pyrimidinone;
1-(3-deoxy-3-C-ethyl-D-xylofuranosyl)-
4-methoxy-5-ethyl-2(1H)-pyrimidinone;
1-(3-deoxy-3-C-ethyl-D-xylofuranosyl)-
4-ethoxy-5-ethyl-2(1H)-pyrimidinone;
1-(3-deoxy-3-C-ethyl-D-xylofuranosyl)-
4-amino-5-bromo-2(1H)-pyrimidinone;
1-(3-deoxy-3-C-ethyl-D-xylofuranosyl)-
4-amino-5-fluoro-2(1H)-pyrimidinone;
1-(3-deoxy-3-C-ethyl-D-xylofuranosyl)-
4-hydroxy-5-amino-2(1H)-pyrimidinone;
1-(3-deoxy-3-C-ethyl-D-xylofuranosyl)-
4-hydroxy-5-methylamino-2(1H)-pyrimidinone; and
1-(3-deoxy-3-C-ethyl-D-xylofuranosyl)-
4-hydroxyl-5-dimethylamino-2(1H)-pyrimidinone.

Both α- and β-anomers of the compounds of the present invention are prepared by reacting a 2,4-dialkoxypyrimidine (X) with a 2,5-di-O-acyl-3-deoxy-3-C-lower-alkyl-D-xylofuranosyl halide (VI) to form a 1-(2,5-di-O - acyl-3-deoxy-3-C-lower-alkyl-D-xylofuranosyl)-4-alkoxy-2(1H)-pyrimidinone (XI). These intermediate compounds are then reacted with ammonia, or a primary or secondary amine to produce compounds (XII) wherein L is amino or substituted amino. The reaction product from Step A may also be hydrolyzed under acidic or basic conditions to produce compounds where L is hydroxy. Solvents may be lower alkanols. The reaction is illustrated in Flow Sheet III.

FLOW SHEET III

Preparation of 1-(3-deoxy-3-C-lower-alkyl-β-D-xylofuranosyl) pyrimidines

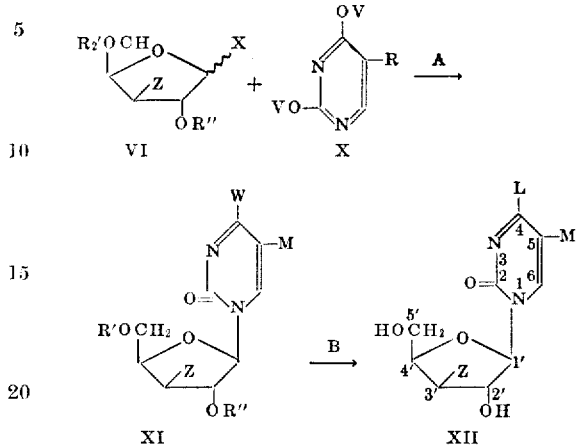

where
L and M are as previously defined;
X is a halogen in either the α or β configuration, or a combination of both;
V is lower alkyl;
W is lower alkoxy and/or hydroxy;
R' and R" are acyl groups; and
Z is lower alkyl.

Examples of acyl groups are alkanoyl such as acetyl, propionyl or butyroyl; benzoyl; and benzoyl substituted by lower alkyl, alkoxy, halo or nitro groups.

More specifically, the process of the present invention involves, in Step A, the reaction of an excess of a 2,4-dialkoxypyrimidine with a 2,5-diacyl-3-deoxy-3-C-loweralkyl-D-xylofuranosyl halide at a temperature range of about 5° C. to about 120° C., and preferably between about 25° C. to about 60° C. until reaction is complete. In this step, the reaction is carried out in an appropriate solvent. The selection of the solvent is not important as long as it is an inert solvent. Examples of such solvents are methylene chloride, benzene, diethyl ether, dibutyl ether, dioxane, tetrahydrofuran, cyclohexane, and the like. The preferred solvent is methylene chloride. The reaction to produce the α- and β-anomers is normally complete in a few hours to several days, depending on the reaction temperature and the reactivity of the halogenose.

The reaction product from Step A, where W is lower alkoxy, is then reacted with ammonia, or a lower alkylamine such as methylamine, ethylamine, propylamine, or dimethylamine in Step B in an appropriate solvent at about the same temperature range as in Step A, to produce a compound wherein L is amino or lower-alkyl amino.

The novel 2(1H)-pyrimidinone nucleosides can also be obtained by condensing the halo sugar reactant with a mercury complex of an appropriately substituted pyrimidine.

For the preparation of some of the novel compounds of the present invention, an additional step may be required. For example, the 5-halo-derivatives are obtained by halogenating the 1-(3-deoxy-3-C-lower-alkyl-D-xylofuranosyl)-4-hydroxy-2(1H) - pyrimidinone by methods known in the art for halogenating 1-(D-xylofuranosyl)-4-hydroxy-2(1H)-pyrimidinone. The resulting 1-(3-deoxy-3-C-lower-alkyl-D-xylofuranosyl) - 5 - halo - 4 - hydroxy-2-(1H)-pyrimidinone is then converted to the corresponding 1-(3-deoxy-3-C-lower-alkyl-D-xylofuranosyl) - 4 - hydroxy-5-amino-2(1H) - pyrimidinone by treatment with ammonia or a primary or secondary amine as heretofore described. For example, 1-(3-deoxy-3-C-methyl-D-xylofuranosyl) - 4 - hydroxy-5-amino-2(1H)-pyrimidinone is preferably obtained by brominating 1-(2-methyl-D-xylofuranosyl)-4-hydroxy-2(1H)-pyrimidinone, and then reacting the resulting 1-(3-deoxy-3-methyl-D-xylofuranosyl)-4-hydroxy-5-bromo-2(1H)-pyrimidinone with ammonia.

The following examples illustrate methods of carrying out the present invention, but it is to be understood that they are given for purposes of illustration and not of limitation.

EXAMPLE 1

Methyl 2,3-anhydro-5-O-trityl-β-D-ribofuranoside (II)

A solution of 10 g. (0.069 mole) of methyl 2,3-anhydro-β-D-ribofuranoside in 100 ml. of dry pyridine is treated with 19.1 g. (0.069 mole) of chlorotriphenylmethane and stirred at room temperature for 24 hours. The reaction mixture is poured into 500 ml. of ice and water and the aqueous mixture is extracted with four 200-ml. portions of ether. The ether extracts are combined and washed with several portions of water until all of the pyridine is removed. The ether layer is concentrated and the residual solid (43.3 g.) is chromatographed on 1000 g. of silica gel in benzene-ethyl acetate (99:1). Fractions containing mostly the desired product ($R_f$ 0.47—tlc on silica gel in benzene-ethyl acetate (19:1)) and a trace of triphenylcarbinol ($R_f$ 0.59) are pooled and concentrated to dryness. The residue (13.4 g.) is recrystallized from 25 ml. of benzene by adding 50 ml. of petroleum-ether to give 12.1 g. (45%) of methyl 2,3-anhydro-5-O-trityl-β-D-ribofuranoside, M.P. 131–133° C.; $[\alpha]_D$ —62.2° (c., 1 in $CHCl_3$).

EXAMPLE 2

Methyl 3-deoxy-3-C-methyl-5-O-trityl-β-D-xylofuranoside (III)

A solution of 8.0 g. (0.021 mole) of methyl 2,3-anhydro-5-O-trityl-β-D-ribofuranoside in 25 ml. of dry benzene is diluted with 400 ml. of dry ether, stirred and 160 ml. of a solution of 1 M methyl magnesium chloride is added at 25° C. The mixture is stirred and refluxed for 48 hours, cooled and poured into a cold solution of 80 g. of ammonium chloride in 300 ml. of water and 100 ml. of ether. The layers are separated and the aqueous phase is extracted with two 200-ml. portions of ether. The combined ether layers are washed with 200 ml. of 10% ammonium chloride solution, 150 ml. of saturated sodium hydrogen carbonate solution and two 150-ml. portions of water. Concentration of the dried (anhydrous $MgSO_4$) ether solution gives 8.5 g. of residual oil. The oil is combined with 6.5 g. of similar material from another Grignard reaction and the total (15 g.) is chromatographed on 1000 g. of silica gel in benzene-ethyl acetate (19:1). Early fractions contain triphenylcarbinol (2.5 g.) followed by fractions containing methyl 2,3-anhydro-5-O-trityl-β-D-ribofuranoside (3.9 g.). Following the elution of a reaction by-product, fractions containing the desired product are obtained. These fractions are concentrated and yield 6.9 g. (46%) of methyl 3-deoxy-3-methyl-β-D-xylofuranoside: $[\alpha]_D$ —19°; $R_f$ 0.40, tlc on silica gel in benzene-ethyl acetate (4:1).

EXAMPLE 3

Methyl 3-deoxy-3-C-methyl-β-D-xylofuranoside (IV)

A solution of 4.0 g. (9.9 mmoles) of methyl 3-deoxy-3-C-methyl-5-O-trityl-β-D-xylofuranoside in 150 ml. of methanol, 30 ml. of acetic acid and 20 ml. of water is refluxed for 5.5 hours. The solution is concentrated at reduced pressure and several 100-ml. portions of methanol are distilled from the residue to remove excess acetic acid. The residue is chromatographed on 200 g. of silica gel in benzene-ethyl acetate (1:1). After removal of the triphenylcarbinol, fractions containing the product ($R_f$ 0.45; tlc on silica gel in ethyl acetate) are obtained. Concentration of these fractions gives 1.2 g. (75%) of syrupy methyl 3-deoxy-3-C-methyl-β-D-xylofuranoside. On cooling, the syrup yields a crystalline product: M.P. 49–50° C.; $[\alpha]_D$ —12° (c., 1 in $CHCl_3$).

EXAMPLE 4

Methyl 3-deoxy-3-C-methyl-2,5-di-O-p-nitrobenzoyl-β-D-xylofuranoside (V)

A solution of 1.0 g. (6.16 mmoles) of methyl 3-deoxy-3-C-methyl-β-D-xylofuranoside in 58 ml. of dry pyridine is treated with 3.4 g. (18.5 mmoles) of p-nitrobenzoyl chloride and stirred at 25° for 3 hours. About 5 ml. of water is added, and stirring is continued at 25° for 45 minutes. The pyridine is removed at reduced pressure and the residue is dissolved in 200 ml. of chloroform. The chloroform solution is washed with three 25-ml. portions of cold 5% hydrochloric acid and then with saturated sodium hydrogen carbonate solution and finally with water. Concentration of the dried (anhydrous $MgSO_4$) chloroform solution yields a residual oil (3 g.). The oil is chromatographed on 200 g. of silica gel in benzene-ethyl acetate (99:1) and early fractions yield 2.0 g. (70%) of the desired product as an oil. Crystallization of the oil from 2 ml. of benzene and 15 ml. of ether gives 1.6 g. of methyl 3-deoxy-3-C-methyl-2,5-di-O-p-nitrobenzoyl-β-D-xylofuranoside; M.P. 93.5–95° C.; $[\alpha]_D$ —3° (c., 1 in $CHCl_3$); $R_f$ 0.4, tlc on silica gel in benzene-ethyl acetate (19:1).

Later column fractions yield 200 mg. of methyl 3-deoxy-3-C-methyl-2,5-di-O-p-nitrobenzoyl - α-D-xylofuranoside, M.P. 98–100° C.; $[\alpha]_D$ +114° (c., 1 in $CHCl_3$); $R_f$ 0.35.

EXAMPLE 5

3-deoxy-3-C-methyl-2,5-di-O-p-nitrobenzoyl-D-xylofuranosyl chloride (VI)

A solution of 1.8 g. (3.9 mmoles) of methyl 3-deoxy-3-C-methyl-2,5-di-O-p-nitrobenzoyl - β - D-xylofuranoside in 25 ml. of acetic acid is cooled to 10° C. and 5 ml. of acetyl chloride and 54 ml. of acetic acid saturated with hydrogen chloride at 10° C. are added. After 4 hours at 25° C. the solution is concentrated at reduced pressure and four 25-ml. portions of dry toluene are distilled from the residue at reduced pressure. The partly crystalline solid, a mixture of 3-deoxy-3-C-methyl-2,5-di-O-p-nitrobenzoyl-D-xylofuranosyl chloride and 1-O-acetyl-3-deoxy-3-C-methyl-2,5-di-O-p-nitrobenzoyl-α(and β)-D-xylofuranose, is treated with 100 ml. of ether saturated with hydrogen chloride at 0° C. containing 5 ml. of acetyl chloride. The mixture is kept in a stoppered flask at 25° C. for 3 hours. The mixture is concentrated at reduced pressure and four 25-ml. portions of dry toluene are distilled from the residual solid at reduced pressure giving 1.8 g. of 3-deoxy-3-C-methyl-2,5-di-O-p-nitrobenzoyl-D-xylofuranosyl chloride.

In accordance with all of the procedures of Examples 1 to 5, but starting in Example 1 with the α-derivative, the corresponding α-intermediates are obtained, with the end product being a mixture as in Example 5.

EXAMPLE 6

Methyl 2-O-benzoyl-3-deoxy-3-C-methyl-5-O-trityl-β-D-xylofuranoside (IIIA)

A solution of 1.8 g. (3.9 mmoles) of methyl 3deoxy-3-C-methyl-5-O-trityl-β-D-xylofuranoside in 30 ml. of pyridine is treated with 0.94 ml. (7.4 mmoles) of benzoyl chloride and stirred at 25° C. for 1 hour. About 2 g. of ice is added and after being stirred for 30 minutes at 25° C., the mixture is concentrated. The residue is treated with 20 ml. of water and extracted with one 50-ml. and two 15-ml. portions of ether. The combined ether extracts are washed with 25 ml. of 10% HCl, two 25-ml. portions of saturated $NaHCO_3$ solution, and four 25-ml. portions of water. The ether solution is concentrated and the residual oil is crystallized from ether-petroleum ether giving 1 g. (47%) of methyl 2-O-benzoyl-3-deoxy-3-C-methyl-5-O-trityl-β-D-xylofuranoside; M.P. 110–112° C., $[\alpha]_D$ —23° C. (c., 1 in CHCl$_3$); R$_f$ 0.56, tlc on silica gel in benzene-ethyl acetate (97.5:2.5).

EXAMPLE 7

Methyl 2-O-benzoyl-3-deoxy-3-C-methyl-β-D-xylofuranoside (IVA)

A solution of 850 mg. (1.47 mmoles) of methyl 2-O-benzoyl-3-deoxy-3-C-methyl - 5 - O-trityl-β-D-xylofuranoside in 5.95 ml. of acetic acid, 4.25 ml. of water and 34 ml. of methanol is heated at the reflux temperature for 16 hours. The solution is concentrated, and methanol is distilled from the residue to remove residual acetic acid. The residue is chromatographed on 20 g. of silica gel in benzene-ethyl acetate (19:1) to give 389 mg. (99%) of methyl-2-O-benzoyl-3-deoxy-3 - C-methyl-β-D-xylofuranoside as an oil. R$_f$ 0.31, tlc on silica gel in benzene-ethyl acetate (4:1), $[\alpha]_D$ —0.2° (c. 0.5, CHCl$_3$).

EXAMPLE 8

Methyl 2,5-di-O-benzoyl-3-deoxy-3-C-methyl-β-D-xylofuranoside (V)

A solution of 325 mg. (0.63 mmole) of methyl 2-O-benzoyl-3-deoxy-3-C-methyl-β-D-xylofuranoside in 10 ml. of dry pyridine is treated with 177 mg. (0.145 ml. 1.26 mmoles) of benzoyl chloride, and the solution is stirred at 25° C. for one hour. About 1 g. of ice is added and, after being stirred at 25° C. for 1 hour, the mixture is concentrated. The residue is dissolved in 50 ml. of ether, and the ether solution is washed with two 15-ml. portions of 10% HCl, three 15-ml. portions of saturated NaHCO$_3$ and several 15-ml. portions of water. Concentrations of the ether solution gives a residual oil (397 mg.) which is chromatographed on 20 g. of silica gel in benzene-ethyl acetate (97.5:2.5). The yield of methyl 2,5-di-O-benzoyl-3-deoxy-3-C-methyl-β-D-xylofuranoside, an oil, as 225 mg. (72%). $[\alpha]_D$ 0.2° (c. 1, CHCl$_3$); R$_f$ 0.66, tlc on silica gel in benzene ethyl acetate (19:1).

EXAMPLE 9

2,5-di-O-benzoyl-3-deoxy-3-C-methyl-D-xylofuranosyl chloride (VI)

A solution of 2 g. (5.35 mmoles) of methyl 2,5-di-O-benzoyl-3-deoxy-3-C-methyl-β-D-xylofuranoside in 25 ml. of acetic acid is treated with 0.5 ml. acetyl chloride and 50 ml. of acetic acid saturated with HCl at 0° C. and the solution is kept at 25° C. for 3 hours. The solvent is removed. The residue is dissolved in 100 ml. of ether containing 0.25 ml. of acetyl chloride saturated with HCl at 0° C., and then kept at 25° C. for 16 hours. The ether is removed and three 50-ml. of dry toluene is distilled from the residual chloro sugar, 2,5-di-O-benzoyl-3-deoxy-3-C-methyl-D-xylofuranosyl chloride, to remove last traces of HCl and acetic acid.

In accordance with the above procedures, but reacting with ethyl or n-propyl magnesium chloride in Example 2 instead of with methyl magnesium chloride, and then following the procedures of Examples 3–5 or Examples 6–9 the corresponding 3-deoxy-3-C-ethyl(or n-propyl)-2,5-O-diacyl-D-xylofuranosyl chloride is obtained.

EXAMPLE 10

3'-deoxy-3'-C-methyladenosine and its α-D anomer

About 100 ml. of xylene is distilled from a suspension of 1.8 g. (3.9 mmoles) chloromercuri-6-benzamidopurine in 350 ml. of xylene. The mixture is cooled and a suspension of 1.8 g. (3.9 mmoles) of 3-deoxy-3-C-methyl-2,5-di-O-p-nitrobenzoyl-D-xylofuranosyl chloride (Example 5) in 50 ml. of dry xylene is added. The mixture is refluxed and stirred until a clear solution is obtained. The solution is cooled and a solid separates. Additional solid separates after the addition of 400 ml. of petroleum-ether. The mixture is cooled, and the solid is separated and dissolved in 500 ml. of warm chloroform. The chloroform solution is washed with four 50-ml. portions of 30 percent potassium iodide solution and two 50-ml. portions of water. Concentration of the chloroform layer yields 2.8 g. of residual semi-solid. The product is chromatographed on 70 g. of silica gel in chloroform-ethyl acetate (4:1) and, after removal of a small amount of more mobile by-product, fractions are obtained which contain 1.8 g. (69%) of 6-benzamido-9-(3-deoxy-3-C-methyl-2,5-di-O-p-nitrobenzoyl - α(and β) - D - xylofuranosyl) purine: R$_f$ 0.59, tlc on silica gel in ethyl acetate-benzene (3:1).

A mixture of 1.5 g. (2.24 mmoles) of 6-benzamido-9-(2,5 - di - O - p - nitrobenzoyl - 3 - deoxy-3-C-methyl-α(and β)-D-xylofuranosyl)purine and 15 ml. of dry methanol is treated with a solution prepared from 1.03 mg. (4.48 mg. atom) of sodium and 25 ml. of dry methanol. The mixture is refluxed for 2 hours. The solution is concentrated to dryness and the residue is dissolved in 35 ml. of water adjusted to pH 7 with acetic acid and washed with five 50-ml. portions of ether and three 25-ml. portions of chloroform. The water layer is adjusted to pH 4 with acetic acid and p-nitrobenzoic acid precipitates and is filtered off. The filtrate is extracted with ether and chloroform and is concentrated. A residue (850 mg.) of 3'-deoxy-3'-C-methyladenosine and its α-D anomer is obtained: R$_f$ 0.56, tlc on cellulose in water.

A 350-mg. sample of the mixture of products is chromatographed on 20 g. of silica gel, eluting first with ethyl acetate-methanol (19:1), and then with ethyl acetate-methanol (9:1). Elution of the column gives first 41 mg. of pure 3'-deoxy-3'-C-methyladenosine which is crystallized from methanol: M.P. 184–185°, R$_f$ (tlc) 0.78 on silica gel in chloroform-methanol-water (60:40:10). After several fractions containing both products, fractions yielding 81 mg. of 9-(3'-deoxy-3'-C-methyl-α-D-xylofuranosyl) adenine are obtained: R$_f$ (tlc) 0.67 on silica gel in chloroform-methanol-water (60:40:10).

EXAMPLE 11

9 - (3 - deoxy - 3 - C - methyl-α-D-xylofuranosyl)adenine and 9 - (3 - deoxy - 3 - C - methyl-β-D-xylofuranosyl) adenine (3'-deoxy-3'-C-methyladenosine)

About 150 ml. of xylene is distilled from a suspension of 2.53 g. (5.35 mmoles) of chloromercuri-6-benzamidopurine in 250 ml. of xylene. The mixture is cooled to 30° C., treated with a solution of 5.35 mmoles of 2,5-di - O - benzoyl - 3 - deoxy - 3 - C - methyl - D - xylofuranosyl chloride in 50 ml. of dry xylene, and heated to the reflux temperature. Almost complete solution is obtained, and after 1 hour the hot solution is filtered and treated with 300 ml. of petroleum-ether. The precipitate is collected and dissolved in 300 ml. of chloroform and washed with four 50-ml. portions of 30% KI and two 50-ml. portions of water. Concentration of the chloroform solution gives a residue (2.7 g.) of crude product. Chromatography of this material on 100 g. of silica gel in CHCl$_3$-EtOAc (4:1) gives 2.35 g. of purified 6-benzamido-9-(2,5 - di - O - benzoyl - 3 - deoxy - 3 - C - methyl-α-D-xylofuranosyl)purine as a glass.

A solution of 1.7 g. (2.95 mmoles) of 6-benzamido-9-(2,5 - di - O - benzoyl - 3 - deoxy - 3 - C - methyl-α(and β)-D-xylofuranosyl)purine in 50 ml. of methanol containing 55 g. of ammonia is heated at 100° C. for 20 hours. The reaction mixture is concentrated to dryness and the residue is dissolved in 50 ml. of water and washed with eleven 40-ml. portions of benzene to remove benzamide. The water layer is freeze dried and the residual solid (800 mg.) is dissolved in 6 ml. of methanol and 25 ml. of ether is added. Crystalline 9-(3-deoxy-3-C-methyl-β-D-xylofuranosyl)adenine (133 mg., M.P. 179–182°) is obtained. The filtrate is concentrated and the residue (650 mg.) is chromatographed on 45 g. of silica gel in ethyl acetate-methanol (19:1). Selected fractions of eluent yield an additional 260 mg. of 9-(3-deoxy-3-C-methyl-β-D-xylofuranosyl)adenine followed by fractions which contain the α-anomer. Removal of the solvent gives a residue of 150 mg. of 9-(3-deoxy-3-C-methyl-α-D-xylofuranosyl)adenine.

Following the above procedures, but using chloromercuri-2,6-dibenzamidopurine as the reactant in place of chloromercuri-6-benzamidopurine, the resulting product is 9 - (3 - deoxy-3-C-methyl-D-xylofuranosyl)-2,6-diaminopurine.

EXAMPLE 12

7 - (and 9)-(3 - deoxy - 3 - C -methyl-β-D-xylofuranosyl) guanine: 7-(and 9)-(3 - deoxy - 3 - C - methyl-β-D-xylofuranosyl)-2-amino-6-hydroxypurine About 25 ml. of xylene is distilled from a suspension of 5.95 g. (14 mmoles) of chloromercuri - 2 - acetamidohypoxanthine in 175 ml. of xylene in order to remove last traces of water. The suspension is cooled to 25° C. and 14 mmoles of 3-deoxy-3-C-methyl - 2,5 - di - O - p-nitrobenzoyl-D-xylofuranosyl chloride in 25 ml. of dry xylene is added. The mixture is stirred and heated. At about 50° C. to 100° C. the solid changes from a granular form to flocculent. After being refluxed for one hour the hot mixture is filtered to remove a solid. Leaching the solid with three 50 ml. portions of boiling chloroform removes some soluble product and leaves insoluble starting chloromercuri derivative and inorganic salts.

The original filtrate is diluted with two volumes of petroleum ether and the solid which separates is dissolved in the chloroform solution obtained above. The chloroform solution (plus an additional 100 ml.) is washed with two 75 ml. portions of 30% potassium iodide and one 75 ml. portion of water. The dried chloroform layer is concentrated and the crude product is chromatographed on 100 g. of silica gel. Elution with a mixture of acetone-methanol gives, after removal of some mobile impurities, fractions which on concentration yield a residual solid. This material is dissolved in chloroform and washed with water. Concentration of the chloroform layer gives 2-actamido - 7 - (3-deoxy-3-C-methyl-2,5-di-O-p-nitrobenzoyl-D-xylofuranosyl)hypoxanthine.

A suspension of 800 mg. of 2-acetamido-9-(3-deoxy-3-C - methyl - 2,5-di-O-p-nitrobenzoyl-D-xylofuranosyl)-hypoxanthine in 8 ml. of dry methanol is treated with a solution of 105 mg. (4.5 mg. atom) of sodium in 8 ml. of dry methanol and the mixture is refluxed for two hours. After 15 minutes of refluxing, no further change in the ultraviolet absorption spectrum can be observed. The mixture is concentrated to dryness. The residue is dissolved in 35 ml. of water and the pH is adjusted to 7 by the addition of acetic acid. The clear solution is washed with three 8 ml. portions of chloroform and the aqueous layer is concentrated to a volume of 10 ml. After being cooled for several hours, the precipitated product is removed. Recrystallization from water gives 9-(3-deoxy-3-C-methyl-D-xylofuranosyl)guanine.

A suspension of 900 mg. of 2-acetamido-7-(3-deoxy-3-C - methyl-2,5-di-O-p-nitrobenzoyl-D-xylofuranosyl)guanine in 8 ml. of dry methanol is treated with a solution of 132 mg. (5.7 mg. atom) of sodium in 8 ml. of dry methanol and the mixture is refluxed for 3.5 hours. Periodic examination of the ultraviolet absorption spectrum indicates that the reaction is complete after 2.5 hours. The mixture is concentrated and the residue is dissolved in 40 ml. of water. The solution is washed with 15 ml. of chloroform and the pH of the aqueous phase is adjusted to 7 with acetic acid. The precipitated product (356 mg.) is filtered and washed with 5 ml. of water, 10 ml. of alcohol-ether (1:9), two 10 ml. portions of boiling chloroform and 10 ml. of ether. Recrystallization from water gives 7-(3-deoxy-3-C-methyl-D-xylofuranosyl)guanine.

EXAMPLE 13

9-(3-deoxy-3-C-methyl-D-xylofuranosyl)-6-methylpurine

A suspension of 3.7 g. (10 mmoles) of chloromercuri 6-methylpurine in 200 ml. of xylene is dried by distilling about 50 ml. of xylene. The cooled suspension is treated with 4.94 g. (10 (mmoles) of 3-deoxy-3-C-methyl-2,5-di-O-p-nitrobenzoyl-D-xylofuranosyl chloride dissolved in 30 ml. of dry xylene. The mixture is stirred and refluxed for 2 hours and then filtered to remove insoluble material. The filtrate is diluted with 4 volumes of petroleum ether and, after being cooled for about 2 hours in an ice bath, the mixture is filtered. The solid is dissolved in 200 ml. of chloroform and washed with two 30 ml. portions of 20% aqueous potassium iodide solution. The chloroform layer is dried over anhydrous magnesium sulfate and concentrated to a residue of 9-(3-deoxy-3-C-methyl-2,5-di-O-p-nitrobenzoyl-D-xylofuranosyl)-6-methylpurine.

A mixture of 590 mg. (0.98 mmole) of 9-(3-deoxy-3-C - methyl - 2,5-di-O-p-nitrobenzoyl-D-xylofuranosyl)-6-methylpurine and 50 ml. of dry methanol is treated with a solution prepared from 24 mg. (1 mg. atom) of sodium and 10 ml. of dry methanol. The mixture is refluxed for 4 hours and concentrated to dryness. The residue is dissolved in 30 ml. of water and neutralized (pH 7) with acetic acid. When the water layer is concentrated to a small volume and cooled, 9-(3-deoxy-3-C-methyl-D-xylofuranosyl)-6-methylpurine precipitates.

EXAMPLE 14

9-(3-deoxy-3-C-methyl-D-xylofuranosyl)-6-chloropurine

About 100 ml. of xylene is distilled from a suspension of 6.55 g. (16.8 mmoles) of chloromercuri-6-chloropurine in 460 ml. of xylene in order to remove the last traces of water. A solution of 9.05 g. (16.8 mmoles) of 3-deoxy-3-C- methyl-2,5-di-O-p-nitrobenzoyl-D-xylofuranosyl bromide in 40 ml. of dry xylene is added to the stirred suspension at 25° C. The mixture is refluxed for 2 hours. The hot mixture is filtered to remove insoluble material. The filtrate is concentrated to 150 ml. and diluted with 300 ml. of petroleum ether. The mixture is kept at 5° C. for one hour and filtered. The solid is washed with three 20 ml. portions of petroleum ether and dried. The crude product is dissolved in 300 ml. of hot chloroform and washed with two 80 ml. portions of 30% potassium iodide solution and two 80 ml. portions of water. The dried chloroform layer, dried over magnesium sulfate, is concentrated, and 9 - (3 - deoxy-3-C-methyl-2,5-di-O-p-nitrobenzoyl-D-xylofuranosyl)-6-chloropurine is obtained. The product is purified by chromatography on a short alumina column in chloroform.

A solution of 479 mg. 0.98 mmole) of 9-(3-deoxy-3-C-methyl - 2,5 - di - O - p-nitrobenzoyl-D-xylofuranosyl)-6-chloropurine in 20 ml. of cold methanol containing 2 g. of anhydrous ammonia is kept at 5° C. for 20 hours. The solution is concentrated at reduced pressure and at a temperature of less than 20° C. The residue is recrystallized from methanol to give 9-(3-deoxy-3-C-methyl-D-xylofuranosyl)-6-chloropurine.

EXAMPLE 15

9-(3-deoxy-3-C-methyl-D-xylofuranosyl)-6-methylaminopurine

A mixture of 1 g. (1.6 mmoles) of 9-(3-deoxy-3-C-methyl-2,5-di-O-nitrobenzoyl - D - xylfuranosyl) - 6-chloropurine, as prepared in Example 13, and 8 g. of methylamine in 25 g. of dry methanol is heated for 10 hours at 100° C. in a sealed tube. The solution is concentrated to dryness at reduced pressure and the residue is dissolved in 25 ml. of water. The water solution is washed with two 5 ml. portions of benzene. The aqueous layer is stirred for 2.5 hours with 3.5 g. of moist Dowex II-X8, during which time the pH of the solution rises from 7 to 9. The resin is removed and washed with three 15 ml. portions of water. The filtrate and washings are concentrated to a residue containing 9-(3-deoxy-3-C-methyl-D-xylofuranosyl)-6-methylaminopurine.

In accordance with the above procedure, but reacting 9 - (3 - deoxy-3-C-methyl-2,5,-di-O-p-nitrobenzoyl-D-xylofuranosyl)-6-chloropurine with an equivalent amount of ethylamine or dimethylamine in place of methylamine, there is obtained the corresponding 9-(3-deoxy-3-C-methyl-D-xylofuranosyl) - 6 - ethylaminopurine or 9-(3-deoxy - 3 - C - methyl - D-xylofuranosyl)-6-dimethylaminopurine, respectively.

EXAMPLE 16

9-(3-deoxy-3-C-methyl-D-xylofuranosyl)purine

A solution of 1 g. (1.6 mmoles) of 9-(3-deoxy-3-C-methyl - 2,5 - di-O-p-nitrobenzoyl-D-xylofuranosyl)-6-chloropurine, as prepared in Example 14, in 17 ml. of dioxane with 80 mg. (2.0 mmoles) of magnesium oxide and 0.5 g. of 5% palladium-on-charcoal catalyst is shaken for 98 hours in an atmosphere of hydrogen at 25° C. The mixture is filtered and concentrated by distillation at reduced pressure to a residue containing 9-(3-deoxy-3-C - methyl - 2,5 - di - O-p-nitrobenzoyl-D-xylofuranosyl) purine.

A solution of 400 mg. (0.69 mmole) 9-(3-deoxy-3-C-methyl - 2,5 - di - O - p-nitrobenzoyl-D-xylofuranosyl) purine in 8 ml. of dry methanol is treated with a solution made from 23 mg. (1 mm. atom) of sodium and 8 ml. of dry methanol. The pale yellow solution is refluxed for 3 hours and concentrated to dryness at reduced pressure. The residue is dissolved in 15 ml. of water and the pH is adjusted to 6.5 with acetic acid. The solution is extracted with four 5 ml. portions of chloroform and the water phase is concentrated to dryness at reduced pressure to a residue containing 9-(3-deoxy-3-C-methyl-D-xylofuranosyl)purine.

EXAMPLE 17

9-(3-deoxy-3-C-methyl-D-xylofuranosyl)purine-6-thiol

A suspension of 1.25 g. (1.96 mmoles) of 9-(3-deoxy-3 - C - methyl-2,5-di-O-p-nitrobenzoyl-D-xylofuranosyl)-6-chloropurine, prepared as in Example 14, and 307 mg. (4.0 mmoles) of thiourea in 3 ml. of ethanol is refluxed for 40 minutes. After 5 minutes a clear, colorless solution is obtained which becomes yellow in 15 minutes and shortly thereafter colorless crystals of 9-(3-deoxy-3-C-methyl - 2,5 - di - O - p-nitrobenzoyl-D-xylofuranosyl) purine-6-thiol crystallize out of solution.

A suspension of 400 mg. (0.64 mmoles) of 9-(3-deoxy-3 - C - methyl - 2,5 - di-O-p-nitrobenzoyl-D-xylofuranosyl)purine-6-thiol in 3.5 ml. of dry methanol is treated with a solution made from 19.5 mg. of sodium and 3.5 ml. of dry methanol is added. Complete solution occurs immediately. The solution is refluxed for three hours. The solution is concentrated by distillation at reduced pressure. The residue is dissolved in 6 ml. of water and the pH of the solution is adjusted to 9 with acetic acid. The aqueous mixture is extracted with four 1.5 ml. portions of methylene chloride. The water layer is concentrated by distillation to a volume of 4 ml. and the pH is adjusted to 4 with acetic acid. The concentration of the solution gives a residue containing 9-(3-deoxy-3-C-methyl-D-xylofuranosyl)purine-6-thiol.

EXAMPLE 18

9-(3-deoxy-3-C-methyl-D-xylofuranosyl)-6-methylthiopurine

A boiling mixture of 605 mg. (1.9 mmoles) of 9-(3-deoxy-3-C-methyl-D-xylofuranosyl)-6-chloropurine in 30 ml. of anhydrous methanol is treated with a solution prepared by saturating 20 ml. of 0.1 N sodium methoxide in methanol with methyl mercaptan. After being refluxed for about 30 minutes, the solution is cooled and concentrated to dryness. The residue is dissolved in hot water and on cooling, 9-(3-deoxy-3-C-methyl-D-xylofuranosyl)-6-methylthiopurine separates.

EXAMPLE 19

3'-deoxy-3'-C-methyl-2-fluoroadenosine

A solution of 670 mg. (2.26 mmoles) of 9-(3-deoxy-3-C - methyl - D - xylofuranosyl) - 2,6-diaminopurine, as prepared in Example 6, in 6.8 ml. of 48% aqueous $HBF_4$ at 0° C. is cooled to —10° C., vigorously stirred, and 0.6 ml. of a solution containing 300 mg. of $KNO_2$ is added in 0.05 ml. portions. The temperature is lowered to —30 to —40° C. and stirring is continued for 15 minutes. The pH of the reaction mixture is adusted to 4 by adding 3.1 N KOH dropwise at —5 to —10° C. The neutralization is continued to pH 6 at 0° C. During the neutralization, a total of 17 ml. of butanol-saturated water is added to facilitate stirring. After being stirred at 25° C. for 1 hour, the reaction solution is extracted with four 35 ml. portions of butanol-saturated water. The combined extracts are washed with four 15 ml. portions of water-saturated butanol. Concentration of the butanol layer gives a residue which is purified by chromatography on 25 g. of silica gel in mixtures of acetone and ethanol. Fractions containing only the desired product are combined and concentrated. The residue is dissolved in 100 ml. of ethanol, concentrated to a small volume and cooled to obtain crystalline 9-(3-deoxy-3-C-methyl-D-xylofuranosyl)-6-amino-2-fluoropurine.

In accordance with the procedures of Examples 10–18, but carrying out the reactions with the 3-deoxy-3-C-ethyl or 3-deoxy-3-C-propyl derivative instead of the 3-deoxy-3-C-methyl compound, the corresponding 3-deoxy-3-C-ethyl or 3-deoxy-3-C-propyl products are obtained.

EXAMPLE 20

1 - (2,5-di-O-benzoyl-3-deoxy-3-C-methyl-α-D-xylofuranosyl-4-methoxy-2(1H)-pyrimidinone and 1-(2,5-di-O-benzoyl - 3 - deoxy - 3-C-methyl-β-D-xylofuranosyl)-4-methoxy-2(1H)-pyrimidinone A mixture of 1.6 g. (11.4 mmoles) of 2,4-dimethoxypyrimidine and 5.35 mmoles of 2,5-di-O-benzoyl-3-deoxy-3-C-methyl-D-xylofuranosyl chloride in 70 ml. of dichloromethane is kept at 25° C. for 12 days, although the reaction is largely complete after 3 days. The mixture is concentrated to dryness and the residue in 150 ml. of ethylacetate is washed with three 30-ml. portions of cold 5% hydrochloric acid, 5% sodium hydrogen carbonate, and water until neutral. Concentration of the ethyl acetate layer gives a residual oil (2.1 g.) which is chromatographed on 200 g. of silica gel in benzene-ethyl acetate (9:1). Fractions (20 ml.) 48 to 86 are combined and concentrated. A residue (600 mg. of 1-(2,5-di-O-benzoyl-3 - deoxy - 3 - C-methyl-β-D-xylofuranosyl)-4-methoxy-2 (1H)-pyrimidinone is obtained. Fractions 87–140 are combined and concentrated. A residue (120 mg.) of 1-(2,5 - di-O-benzoyl-3-deoxy-3-C-methyl-α-D-xylofuranosyl)-4-methoxy-2(1H)-pyrimidinone containing a small amount of the β-anomer is obtained. The product is purified by a second chromatography on silica gel in benzene-ethyl acetate (9:1).

EXAMPLE 21

1-(3-deoxy-3-C-methyl-β-D-xylofuranosyl)cytosine (3'-deoxy-3'-C-methylcytidine)

A solution of 500 mg. (1.08 mmoles) of 1-(2,5-di-O-benzoyl - 3 - deoxy-3-C-methyl-β-D-xylofuranosyl)-4-methoxy-2(1H)-pyrimidinone in 15 ml. of methanol containing 10 g. of liquid ammonia is heated in a pressure vessel at 100° C. for 20 hours. The reaction mixture is concentrated to dryness. The residue is dissolved in 30 ml. of water and washed with three 10-ml. portions of dichloromethane to remove benzamide. The water layer is concentrated to dryness and the residue is crystallized from 3 ml. of methanol by adding ether. Recrystallization from methanol-ether gives 45 mg. of 1-(3-deoxy-3-C-methyl-β-D-xylofuranosyl)cytosine.

EXAMPLE 22

1-(3-deoxy-3-C-methyl-α-D-xylofuranosyl)cytosine

When 500 mg. of 1-(2,5-di-O-benzoyl-3-deoxy-3-C-methyl - α - D-xylofuranosyl)-4-methoxy-2(1H) pyrimidinone is treated as in Example 21, 1-(3-deoxy-3-C-methyl-α-D-xylofuranosyl)cytosine is produced.

EXAMPLE 23

1-(2,5-di-O-benzoyl-3-deoxy-3-C-methyl-D-xylofuranosyl)-5-fluoro-4-methoxy-2(1H) pyrimidinone A solution of 4.8 g. (9.7 mmoles) of 2,5-di-O-benzoyl-3-deoxy-3-C-methyl-D-xylofuranosyl chloride in 18 ml. of dry toluene is added to 3.5 g. (22.2 mmoles) of 2,4-dimethoxy-5-fluoropyrimidine and the mixture is refluxed for 96 hours. The toluene solution is concentrated, and the residue is dissolved in 100 ml. of ether and extracted with three 50-ml. portions of N hydrochloric acid, three 50-ml. portions of saturated sodium hydrogen carbonate, and finally with water. The ether solution is concentrated, and the residue (6.2 g.) is chromatographed on 150 g. of silica gel in benzene-ethyl acetate (19:1) to obtain 1-(2,5-di - O - benzoyl - 3-deoxy-3-C-methyl-D-xylofuranosyl)-5-fluoro-4-methoxy-2(1H)-pyrimidinone.

In accordance with the above procedure, but replacing the 2,4-dimethoxy-5-fluoropyrimidine with an equivalent amount of 2,4-dimethoxy-5-trifluoromethylpyrimidine, or 2,4-dimethoxy-5-methylpyrimidine, 1-(2,5-di-O-benzoyl-3 - deoxy - 3-C-methyl-D-xylofuranosyl)-4-methoxy-5-trifluoromethyl-2(1H)-pyrimidinone or 1-(2,5-di-O-benzoyl-3 - deoxy - 3-C-methyl-D-xylofurnanosyl)-5-methyl-4-methoxy-2(1H)-pyrimidinone is obtained.

EXAMPLE 24

5-fluoro-1-(3-deoxy-3-C-methyl-β-D-xylofuranosyl)cytosine

A solution of 80 mg. (0.13 mmole) of 1-(2,5-di-O-benzoyl - 3 - deoxy-3-C-methyl-D-xylofuranosyl)-5-fluoro-4-methoxy-2(1H)-pyrimidinone in 7 ml. of methanol, saturated with ammonia at 0° C., is heated at 100° C. in a sealed tube for 18 hours. The reaction solution is concentrated at reduced pressure, and the residue is dissolved in 10 ml. of water and extracted with three 5 ml. portions of ether. The aqueous phase is concentrated at reduced pressure and the residue, when crystallized from 0.2 ml. of methanol-ether, affords 3' - deoxy-5-fluoro-3'-C-methylcytidine.

In accordance with the above procedures, but starting with 1 - (2,5-di-O-benzoyl-3-deoxy-3-C-methyl-D-xylofuranosyl) - 4 - methoxy-5-methyl-2(1H)-pyrimidinone, the 3'-deoxy-3'-C-methyl-5-methylcytidine is obtained.

EXAMPLE 25

5-fluoro-1-(2,5-di-O-benzoyl-3-deoxy-5-fluoro-3-C-methyl-β-D-xylofuranosyl)uracil A suspension of 602.5 mg. (1.0 mmole) of 1-(2,5-di-O-benzoyl - 3-deoxy-3-C-methyl-D-xylofuranosyl)-5-fluoro-4-methoxy-2(1H)-pyrimidinone in 20 ml. of methanol is treated with 160 mg. (4.0 mmoles) of sodium hydroxide and 2 ml. of water. The mixture is refluxed for 45 minutes and the solution is concentrated at reduced pressure. The residue is dissolved in 20 ml. of water, and small portions of Dowex 50 X 4 (H+) resin is added until the pH of the solution is 4.0. The resin and precipitated benzoic acid is removed and washed well with water. The combined filtrates are extracted with six 25 ml. portions of ether. The water layer is concentrated at reduced pressure, and the residue (300 mg.) in 5 ml. of methanol is treated with 1 ml. of ether. The precipitated solid is removed, and the filtrate is concentrated to 0.3 ml. and kept at 5° C. for 18 hours. The solid is recrystallized from methanol-ether to afford 3'-deoxy-5-fluoro-3'-C-methyluridine.

In accordance with the above procedure, but starting with the 1-(2,5-di-O-benzoyl-3-deoxy-3-C-methyl-D-xylofuranosyl)-5-methyl-4-methoxy-2(1H)-pyrimidinone, the 3'-deoxy-3'-C-methyl-5-methyluridine is obtained.

EXAMPLE 26

5-bromo-3'-deoxy-3'-C-methyluridine

A solution of 45.6 mg. (0.2 mmole) of 3'-deoxy-3'-C-methyluridine in 0.4 ml. of water is treated dropwise with a solution of bromine in water until a pale yellow persists. Nitrogen is blown through the solution to remove excess bromine, and the solution is lyophilized. The residual 1 - (3' - deoxy-3'-C-methyl-β-D-xylofuranosyl)-4-hydroxy-5,6-dibromo-2(1,5,6 - H) - pyrimidinone is dissolved in 1.5 ml. of ethanol. The solution is refluxed and hydrogen bromide is evolved. An ultraviolet absorption maximum at 282 mμ is generated during the heating period. The solution is concentrated at reduced pressure and the residual oil dissolved in water and washed with two 1-ml. portions of ether. The water layer is concentrated to dryness. The product is dissolved in 2 ml. of water and treated with 30 mg. of decolorizing carbon. After removal of the carbon, the colorless water solution is concentrated to dryness. Methanol is removed from the residue (53.5 mg.) at reduced pressure several times to eliminate the last traces of water. Trituration of the residue with ether affords 5-bromo-3'-deoxy-3'-C-methyluridine.

EXAMPLE 27

3'-deoxy-3'-C-methyl-5-methylaminouridine

A solution of 3.9 g. (12 mmoles) of 5-bromo-3'-deoxy-3'-C-methyluridine in 40 ml. of anhydrous liquid methylamine is heated at 80° C. for 18 hours in a sealed tube. The amine is evaporated and the residue is dissolved in water and added to a column of 400 ml. of Dowex 50W X4 (H+). The column is washed well with distilled water to remove neutral, ultraviolet absorbing materials and the product is eluted with 0.5 N ammonium hydroxide. Concentration of the ammonium hydroxide eluent gives a residue of 3'-deoxy-3'-C-methyl-5-methyl-aminouridine.

When in the above procedure the methylamine is replaced by ethylamine, dimethylamine, or methanol saturated at 0° C. with ammonia, there is obtained 3'-deoxy-3'-C-methyl-5-ethylaminouridine, 3' - deoxy - 3'-C-methyl-5-dimethylaminouridine, or 3'-deoxy-3'-C-methyl-5-amino-uridine, respectively.

EXAMPLE 28

3'-deoxy-3'-C-methyl-5-trifluoromethyluridine

A solution of 1 g. of 1-2,5-di-O-benzoyl-3-deoxy-3-C-methyl-D-xylofuranosyl)-4-methoxy - 5 - trifluoromethyl-2(1H)-pyrimidinone, as prepared in Example 23, in 50 ml. of methanol containing 1 ml. of concentrated hydrochloric acid is kept at 25° C. for several days. The solution is concentrated to dryness and a residue containing 3'-deoxy-3'-C-methyl-5-trifluoromethyluridine is obtained.

In accordance with all of the procedures of Examples 19 to 28, but carrying out the reactions with the 3-deoxy-3-C-ethyl, or 3-deoxy-3-C-propyl derivative instead of the 3-deoxy-3-C-methyl derivative, the corresponding 3-deoxy-3-C-ethyl, or 3-deoxy-3-C-propyl products are obtained.

Various changes and modifications in the procedures herein disclosed will occur to those skilled in the art, and to the extent that such changes and modifications are embraced by the appended claims, it is to be understood that they constitute part of our invention.

What is claimed is:
1. A compound of the formula

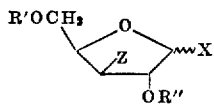

where R' and R" are each hydrogen, or acyl residue of an organic carboxylic acid of the group consisting of lower alkanoyl, benzoyl, or substituted benzoyl; X is chloro, bromo, or lower alkoxy; Z is lower alkyl.

2. The compounds of claim 1 wherein R' and R" are each hydrogen, benzoyl, or p-nitrobenzoyl; X is chloro, bromo, or lower alkoxy; and Z is methyl.

3. A compound of the formula

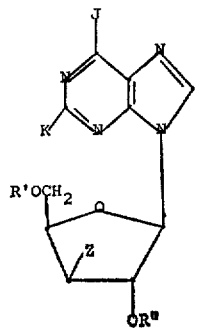

wherein R' and R" are each hydrogen, or acyl residue of an organic carboxylic acid of the group consisting of lower alkanoyl, benzoyl, and substituted benzoyl; Z is lower alkyl; J is hydrogen, lower alkyl, halogen, mercapto, lower alkyl mercapto, amino, or lower alkylsubstituted amino when K is hydrogen; but J is amino when K is hydroxy or amino.

4. The compound according to claim 3 wherein Z is methyl, J is amino, and K is hydrogen.

5. A compound of the formula

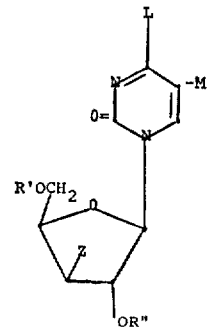

wherein R' and R" are each hydrogen, or acyl residue of an organic carboxylic acid of the group consisting of lower alkanoyl, benzoyl, and substituted benzoyl; Z is lower alkyl; L is lower alkoxy, hydroxy, amino, or loweralkylamino; and M is lower alkoxy, hydroxy, amino, or loweralkylamino, hydrogen, loweralkyl, halogen, or haloloweralkyl.

6. The compound of claim 5 wherein M, R' and R" are hydrogen, Z is methyl, and L is amino.

7. The compound of claim 5 wherein M, R' and R" are hydrogen, Z is methyl, and L is hydroxy.

8. The compound of claim 5 wherein R' and R" are hydrogen, Z is methyl, and L and M are loweralkylamino.

9. The compound of claim 5 wherein R' and R" are hydrogen, Z is methyl, L is amino, and M is fluoro.

References Cited
UNITED STATES PATENTS 3,277,077   10/1966   Holly et al. _____ 260—211.5 R LEWIS GOTTS, Primary Examiner J. R. BROWN, Assistant Examiner U.S. Cl. X.R.

252—300, 405; 260—45.8 A, 45.8 NZ, 209 R, 211.5 R, 999